No. 733,061.

Patented July 7, 1903.

UNITED STATES PATENT OFFICE.

LEO C. MANDEL, OF ST. LOUIS, MISSOURI.

COMPOSITION FOR DENTISTS' TAPERS.

SPECIFICATION forming part of Letters Patent No. 733,061, dated July 7, 1903.

Application filed March 18, 1903. Serial No. 148,390. (No specimens.)

*To all whom it may concern:*

Be it known that I, LEO C. MANDEL, a citizen of the United States, residing at St. Louis, in the State of Missouri, have invented certain new and useful Improvements in Compositions for the Manufacture of Dentists' Tapers, of which the following is a specification.

This invention provides a novel composition which when burned gives off free carbon in the shape of dense smoke, being admirably adapted for blackening the dies and counter-dies used in mechanical dentistry.

In making the composition the following ingredients are compounded in about the proportions specified—*i. e.*, evaporated turpentine, four pounds; sweet-oil, eight ounces; gum-dammar, one ounce.

The evaporated turpentine is prepared by boiling oil of turpentine until quite viscid. Then add the sweet-oil, which stir in thoroughly, after which the gum-dammar is added and the whole stirred to insure a thorough admixing of the constituents. While the mixture is still hot and in a liquid state cords or fibrous strands are immersed therein and when saturated are hung up to harden, when they are ready for use by being lighted.

Having thus described the invention, what is claimed as new is—

1. A composition for the purpose specified, consisting of evaporated turpentine, sweet-oil and gum-dammar, in about the proportions specified.

2. A taper for dentists' use consisting of a cord saturated with a composition consisting of evaporated turpentine, sweet-oil and gum-dammar, substantially as set forth.

In testimony whereof I affix my signature in presence of two witnesses.

LEO C. MANDEL. [L. S.]

Witnesses:
 E. W. HALL,
 C. P. STERNS.